(12) United States Patent
Kimbel et al.

(10) Patent No.: US 12,442,710 B2
(45) Date of Patent: Oct. 14, 2025

(54) METHOD FOR MONITORING THE FUNCTION OF A CAPACITIVE PRESSURE MEASURING CELL

(71) Applicant: IFM Electronic GmbH, Essen (DE)

(72) Inventors: Peter Kimbel, Tettnang (DE); Manfred Maurus, Bad Waldsee (DE); Fabian Kuhnhäuser, Ravensburg (DE); Oliver Blankenhorn, Bodnegg (DE)

(73) Assignee: IFM Electronic GmbH, Essen (DE)

( * ) Notice: Subject to any disclaimer, the term of this patent is extended or adjusted under 35 U.S.C. 154(b) by 315 days.

(21) Appl. No.: 18/022,857

(22) PCT Filed: Jul. 23, 2021

(86) PCT No.: PCT/EP2021/070678
§ 371 (c)(1),
(2) Date: Feb. 23, 2023

(87) PCT Pub. No.: WO2022/042964
PCT Pub. Date: Mar. 3, 2022

(65) Prior Publication Data
US 2023/0314260 A1 Oct. 5, 2023

(30) Foreign Application Priority Data
Aug. 25, 2020 (DE) ...................... 10 2020 122 128.2

(51) Int. Cl.
*G01L 27/00* (2006.01)
*G01L 9/00* (2006.01)
(Continued)

(52) U.S. Cl.
CPC .......... *G01L 27/007* (2013.01); *G01L 9/0072* (2013.01); *G01L 19/0092* (2013.01)

(58) Field of Classification Search
CPC . G01L 9/00; G01L 9/0072; G01L 9/12; G01L 19/00; G01L 19/0092; G01L 19/04; G01L 27/00; G01L 27/007
See application file for complete search history.

(56) References Cited

U.S. PATENT DOCUMENTS 9,316,557 B2 * 4/2016 Walter ..................... G01L 25/00
10,048,156 B2 * 8/2018 Paulitsch ................ G01M 3/40
(Continued)

FOREIGN PATENT DOCUMENTS

CN       1576861 A      2/2005
CN    101738287 A      6/2010
(Continued)

*Primary Examiner* — Nguyen Q. Ha
(74) *Attorney, Agent, or Firm* — Patent Technologies, LLC; Robert D. Gunderman, Jr.

(57) ABSTRACT

The invention relates to a method for monitoring the function of a capacitive pressure measuring cell (10) comprising a measuring capacitor ($C_M$) and a reference capacitor ($C_R$) as well as a temperature element, wherein a pressure measurement value p is obtained by forming the quotient Q from the capacitance values of the reference capacitor ($C_R$) and the measuring capacitor ($C_M$). The method is characterized by the following method steps:

in a matching procedure the characteristic curve of the quotient Q and the capacitance values of the measuring capacitor ($C_M$) are each stored in a lookup table versus the pressure and at different temperature scenarios;

then the corresponding absolute value of the quotient Q and of the capacitance value of the measuring capacitor ($C_M$) from the lookup table are continuously assigned respectively to the determined pressure measurement value p at the temperature detected at this moment by the temperature element;

the behavior of the course in which the two absolute values of the quotient Q and the capacitance value of the measuring capacitor ($C_M$) is compared with each other;

(Continued)

in the case of a significant deviation from an expected behavior, the evaluation unit is temporarily switched into a safety mode and meanwhile the gradient of the temperature element is detected and evaluated;

in the case of a significant increase of the gradient of the temperature element, a temperature compensation is initiated; or in the case of an unchanged gradient of the temperature element, an error signal is generated.

4 Claims, 3 Drawing Sheets

(51) Int. Cl.
*G01L 9/12* (2006.01)
*G01L 19/00* (2006.01)
*G01L 19/04* (2006.01)

(56) References Cited

U.S. PATENT DOCUMENTS

| 2019/0293507 A1 | 9/2019 | Dieterle et al. |
| 2019/0293509 A1 | 9/2019 | Dieterle et al. |

FOREIGN PATENT DOCUMENTS

| CN | 101738422 A | 6/2010 |
| CN | 104081170 A | 10/2014 |
| CN | 107014550 A | 8/2017 |
| CN | 107076629 A | 8/2017 |
| CN | 110082698 A | 8/2019 |
| CN | 110307930 A | 10/2019 |
| DE | 10 2011 078 557 A1 | 1/2013 |
| DE | 10 2018 118 645 B3 | 11/2019 |
| DE | 10 2020 100 675 A1 | 7/2020 |
| EP | 3 124 937 A1 | 2/2017 |
| JP | 2000258272 A | 9/2000 |

\* cited by examiner

METHOD FOR MONITORING THE FUNCTION OF A CAPACITIVE PRESSURE MEASURING CELL

CROSS REFERENCE TO RELATED PATENT APPLICATIONS

This application is a 371 of International Application Number PCT/EP2021/070678 filed Jul. 23, 2021, which claims priority to DE 102020122128.2 filed Aug. 25, 2020, the entire disclosures of which are incorporated herein by reference.

BACKGROUND OF THE INVENTION

1. Field of the Invention

The invention relates to a method for monitoring the function of a pressure measuring cell of a capacitive pressure sensor.

2. Description of Related Art

Capacitive pressure sensors or pressure measuring devices are used in many industrial fields for pressure measurement. They often comprise a ceramic pressure measuring cell as a transducer for the process pressure and evaluation electronics for signal processing.

Capacitive pressure measuring cells consist of a ceramic base body and a membrane, wherein a glass solder ring is arranged between the base body and the membrane. The resulting cavity between the base body and the membrane allows a longitudinal movement of the membrane as a result of the influence of pressure. This cavity is therefore also referred to as measuring chamber. At the underside of the membrane and at the opposite upper side of the base body electrodes are provided, respectively, which together form a measuring capacitor. The effect of pressure causes the membrane to deform, which results in a change in the capacitance of the measuring capacitor.

With the aid of an evaluation unit, the change in capacitance is detected and converted into a pressure measurement value. Usually, these pressure sensors are used to monitor or control processes. They are therefore frequently connected to higher-level control units (PLCs).

A capacitive pressure sensor is known from DE 198 51 506 C1, in which the pressure measurement value is determined from the quotient of two capacitance values of a measuring capacitor and a reference capacitor. Although a pressure measuring cell is not specifically described in this patent specification, the circuit and method described are suitable for capacitive pressure measuring cells. The special feature of this pressure measuring device is that only the amplitude of the square-wave signal, regardless of its frequency, is relevant for the evaluation of the measuring signal at the output as a measure of the detected measured pressure value.

A circuit arrangement for a capacitive pressure sensor is known from EP 0 569 573 B1, in which, too, a quotient method is used for pressure evaluation.

Quotient methods usually assume the following pressure dependencies:

$$p \sim \frac{C_R}{C_M} \text{ or } p \sim \frac{C_R}{C_M} - 1 \text{ or } p \sim \frac{C_M - C_R}{C_M * C_R},$$

wherein $C_M$ is the capacitance of the measuring capacitor, $C_R$ the capacitance of the reference capacitor and p the process pressure to be determined. It is also conceivable to interchange $C_M$ and $C_R$ in the quotient. However, the example given with $C_M$ in the denominator represents the most common form in favor of intrinsic linearization. In the following, therefore, this embodiment is assumed unless otherwise stated.

The reliability of capacitive pressure sensors is becoming increasingly important. For example, publications EP 2 606 330 B1 and DE 10 2018 118 645 B3 address how a medium ingress-caused by a mechanical damage of the pressure measuring cell, in particular of the membrane, or enabled by a possible vent channel—can be reliably detected, and from DE 10 2018 118 646 B3 it is known, how the measuring principle of pressure sensors can be optimized with regard to possible leakage currents on the rear side of the measuring cell-facing away from the medium to be measured- or in parts of the evaluation electronics for the purpose of eliminating air humidity components possibly introduced by the environment and tending to condensation.

It is also well known, for example from DE 10 2011 005 705 B4, that the temperature prevailing during the pressure measurement, in particular that of the medium to be measured, can have a considerable influence on the accuracy of the measurement results obtained. For this reason, parallel to the pressure measurement in addition the temperature is detected by means of a temperature element arranged on the back side of the base body, so that the temperature dependence of the pressure measurement can be compensated.

However, a rapid temperature change, i.e. a so-called thermal shock, which can lead to tensions in the membrane of the pressure measuring cell poses a challenge. The tensions of the membrane result from a temperature difference between a medium acting on the membrane of the pressure measuring cell and the base body of the pressure measuring cell facing away from the medium and thermally connected to the environment.

Against this background, EP 2 189 774 A1 is based on the knowledge that a pressure-induced deformation of the membrane differs from a thermoshock-induced deformation of the membrane for technical measurement reasons. The method disclosed therein for detecting rapid temperature changes is based on the fact that, for measured values of the measurement capacitance $C_M$, the measured values of the reference capacitance Cr are compared with expected values of the reference capacitance Cr which results from the measured values of the measurement capacitance $C_M$, and wherein a temperature jump is detected when the measured value of the reference capacitance is outside a tolerance range around an expected value. However, this method assumes that a rapid temperature change is the sole cause of the detected discrepancy between the measured values and the expected values. In practice, however, this is not always the case. For example, in the event of a mechanical damage to the pressure measuring cell, in particular of the membrane, a comparable effect between the measured values and the expected values would occur, but this would then lead to the erroneous assumption that one has to compensate for an acting temperature instead of replacing the pressure measuring cell or, ultimately, the entire pressure measuring device, since the output pressure measurement values very probably no longer correspond to the actually present pressure conditions.

It is an object of the invention to overcome this disadvantage.

BRIEF SUMMARY OF THE INVENTION

According to the invention, the object is achieved by a method with the features of claim 1. Advantageous embodiments of the invention are provided in the subclaims.

First, in an adjustment procedure, the characteristic curve of the quotient Q and of the capacitance values of the measuring capacitor $C_M$ versus the pressure and at different temperature scenarios have each been stored in a lookup table as expected values. During operation of the pressure measuring cell, based on the lookup table the corresponding amount of the quotient Q as well as the capacitance value of the measuring capacitor $C_M$ is continuously assigned to the determined pressure measurement value p at the temperature detected at that moment by the temperature element, and the behavior of the curve of which the two amounts of the quotient Q and the capacitance value of the measuring capacitor $C_M$ are compared with one another. This comparison could be carried out at an interval of 200 milliseconds as an example. If there is a significant deviation from an expected behavior, the evaluation unit is temporarily switched to a safety mode and meanwhile the gradient of the temperature element is detected and evaluated. If a significant increase in the gradient of the temperature element is detected, an appropriate temperature compensation can be initiated. In this case, the cause of the discrepancy between the measured values and the expected values can be unambiguously assigned to a temperature jump and this error influence on the output measurement result can be corrected by a corresponding compensation. Otherwise, if despite the discrepancy between the measured values and the expected values the temperature element does not show any significant change in its measurement results, a temperature jump can be excluded as the cause and instead a damage of the pressure measuring cell, in particular its membrane, can be assumed. In this case an error signal is generated, which can be of different nature. Simple optical or acoustic warning signals are conceivable, for example, but also corresponding signals received from a higher-level control unit (PLC).

The advantage of the invention is thus that, based on the knowledge that the capacitance values react very quickly to fault influences, it is possible to switch to a kind of "alarm state" at an early stage and to investigate the corresponding environmental conditions with regard to a possible cause. The method according to the invention thus represents quasi a trigger which draws attention to a fault condition-preliminary of unknown cause—so that only subsequently more detailed observations of the possible causes of the fault have to be started and correspondingly targeted countermeasures can be initiated at a very early stage.

An advantageous further development of the invention provides that during the safety mode the pressure measurement value p is obtained only by the capacitance value of the measuring capacitor. The quotient formation from the capacitance values of the measuring and the reference capacitors has the primary objective of compensating for a change in capacitance due to a change in the dielectric constant ar of the dielectric in the measuring chamber. For the period of safety mode, which should be of short duration anyway, this circumstance would be negligible while the advantage, that by use of the capacitance value of the measuring capacitor nevertheless a comparatively plausible pressure measurement value p can be output, predominates.

Advantageously, the measured pressure values p obtained by the measuring capacitor alone and by the quotient Q are then compared with each other. By this comparison of two differently calculated measured values, a plausibility check—possibly also parallel—can be carried out, which draws attention to sudden or also creeping changes in or at the pressure measuring cell.

A further advantageous development provides that during the matching procedure also the charging and discharging times of the measuring and the reference capacitor versus the pressure and at different temperature scenarios have been stored in the lookup table, the corresponding amount of the charging and discharging times from the lookup table are continuously assigned to the determined pressure measurement value p at the temperature detected at this moment by the temperature element, and the behavior of the course of the amounts of the quotient Q, the capacitance value of the measuring capacitor and a respective charging and discharging time are compared with one another. I.e. the entire procedure is extended by the charging and discharging time of the measuring and the reference capacitor, i.e. the time period which is consumed respectively for charging the capacitances up to a certain level and for discharging. In this way, in addition to the described temperature influences and mechanical damages of the pressure measuring cell, external frequency influences can be detected, for example if the measuring device is operated in the vicinity of a frequency converter, so that a coupling of the external signal source frequency and thus resonance formation with the fixed operating or working frequency of the pressure measuring device can occur.

BRIEF DESCRIPTION OF THE DRAWINGS

In the following, the invention is explained in more detail by means of exemplary embodiments with reference to the drawings.

The Figures schematically show.

DESCRIPTION OF THE PREFERRED EMBODIMENTS

In the following description of the preferred embodiments, identical reference symbols denote identical or comparable components.

Figure 1:
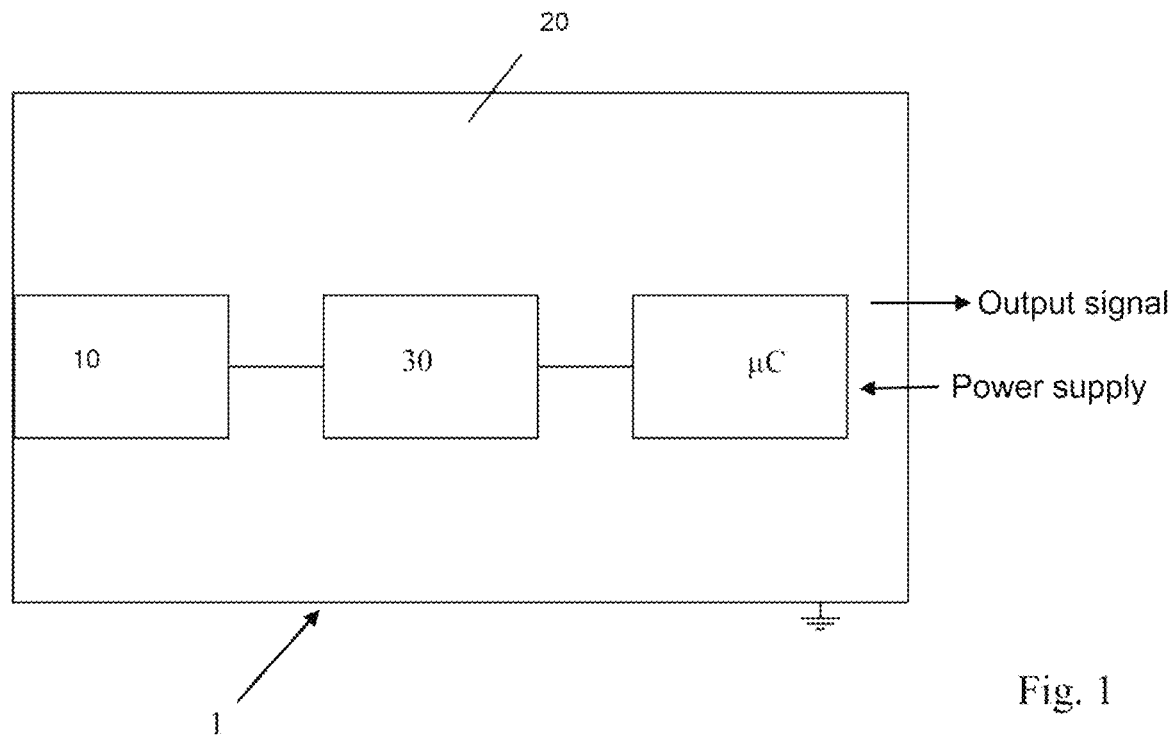
FIG. 1 a block diagram of a capacitive pressure measuring device.

FIG. 1 shows a block diagram of a typical capacitive pressure measuring device used to measure a process pressure p (e.g. of oil, milk, water, etc.). The pressure measuring device 1 is designed as a two-wire device and essentially comprises a pressure measuring cell 10 and evaluation electronics 20. The evaluation electronics 20 comprises an analog evaluation circuit 30 and a microcontroller uC, wherein the analog output signal of the evaluation electronics 20 is digitized and processed further. The evaluation electronics 20 provides the evaluation result as a digital or analog output signal, for example to a PLC. For power supply, the pressure measuring device 1 is connected to a voltage supply line (12-36 V).

Figure 2:
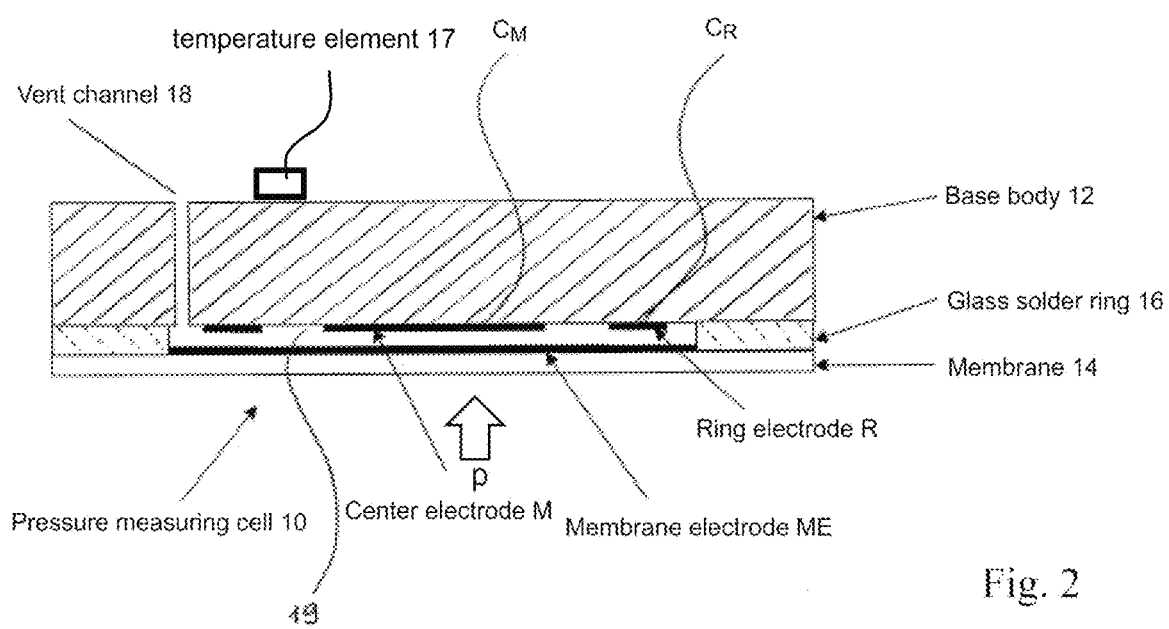
FIG. 2 a schematic sectional view of a capacitive pressure measuring cell.

FIG. 2 shows a schematic diagram of a typical capacitive pressure measuring cell 10, as used manifold in capacitive pressure measuring devices. The pressure measuring cell 10 essentially consists of a base body 12 and a membrane 14, which are connected to each other via a glass solder ring 16. The base body 12 and the membrane 14 delimit a cavity 19 which—preferably only for low pressure ranges up to 50 bar—is connected to the rear side of the pressure cell 10 via a vent channel 18.

Both on the base body 12 and the membrane 14 a plurality of electrodes are provided which form a reference capacitor $C_R$ and a measuring capacitor $C_M$. The measuring capacitor $C_M$ is formed by the membrane electrode ME and the center electrode M, and the reference capacitor $C_R$ is formed by the ring electrode R and the membrane electrode ME.

The process pressure p acts on the membrane 14, which deflects to a greater or lesser extent in accordance with the applied pressure, wherein essentially the distance between the membrane electrode ME and the center electrode M changes. This leads to a corresponding change in capacitance of the measuring capacitor $C_M$. The influence on the reference capacitor $C_R$ is smaller, since the distance between the ring electrode R and the membrane electrode ME changes less than the distance between the membrane electrode ME and the center electrode M.

On the back side of the base body 12, a temperature element 17 is arranged for measuring a temperature at the capacitive pressure measuring cell 10.

In the following, no distinction is made between the designation of the capacitor and its capacitance value. $C_M$ and $C_R$ therefore denote both the measuring and the reference capacitors themselves as well as their respective capacitance.

Figure 3:
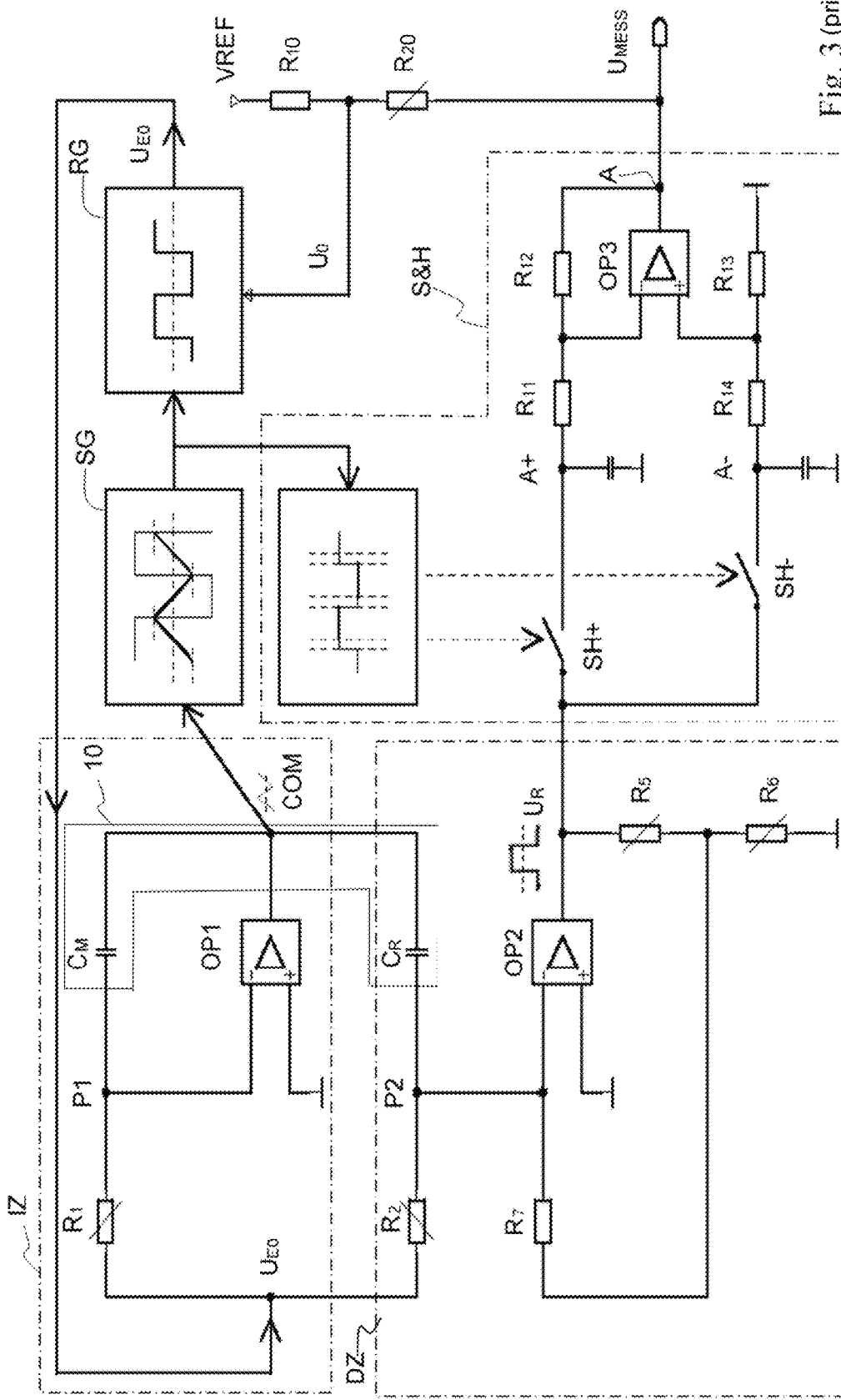
FIG. 3 a known evaluation circuit for a capacitive pressure measuring cell according to FIG. 2.

In FIG. 3, a known evaluation circuit 30 for the pressure measuring cell 10 is shown in more detail. The measuring capacitor $C_M$ is arranged together with a resistor $R_1$ in an integrating branch IZ and the reference capacitor $C_R$ is arranged together with a resistor $R_2$ in a differentiating branch DZ. A square-wave voltage $U_{E0}$, which preferably alternates symmetrically around 0 volts, is applied to the input of the integrating branch IZ. The input voltage $U_{E0}$ is converted via the resistor $R_1$ and the measuring capacitor $C_M$ with the use of an operational amplifier OP1, which operates as an integrator, into a linearly rising or falling voltage signal (depending on the polarity of the input voltage), which is output at the output COM of the integrating branch IZ. Here, the measuring point P1 is virtually grounded by the operational amplifier OP1.

The output COM is connected to a threshold comparator SG, which drives a square-wave generator RG. As soon as the voltage signal at the output COM exceeds or falls below a threshold value, the comparator SG changes its output signal, whereupon the squarewave generator RG respectively inverts its output voltage.

The differentiating branch DZ further consists of an operational amplifier OP2, a voltage divider with the two resistors $R_5$ and Re and a feedback resistor $R_7$. The output of the operational amplifier OP2 is connected to a sample-and-hold circuit S&H. The measuring voltage $U_{Mess}$ is provided at the output of the sample-and-hold circuit S&H, from which the process pressure p acting on the pressure measuring cell 10 is obtained.

The function of this measuring circuit is explained in more detail below. The operational amplifier OP1 ensures that the connection point P1 between the resistor $R_1$ and the measuring capacitor $C_M$ is kept virtually at ground. This causes a constant current $I_1$ to flow across resistor $R_1$, which charges the measuring capacitor $C_M$ until the square-wave voltage $U_{E0}$ changes its sign.

FIG. 3 shows that for the case $R_1=R_2$ and $C_M=C_R$, the measuring point P2 in the differentiating branch DZ is at the same potential as the measuring point P1, i.e. at ground level, even if the connection between the measuring point P2 and the operational amplifier OP2 were not present. This is true not only in this particular case, but whenever the time constants $R_1*C_M$ and $R_2*C_R$ are equal to each other. During zero offset adjustment, this condition is set accordingly via the variable resistors $R_1$ or $R_2$. If the capacitance of the measuring capacitor $C_M$ changes due to the effect of pressure, the condition of equality of the time constants in the integrating branch IZ and in the differentiating branch DZ is no longer given and the potential at the measuring point P2 would deviate from the value zero. However, this change is directly counteracted by the operational amplifier OP2, since the operational amplifier OP2 continues to hold the connection point P2 virtually at ground level. Therefore, a square wave voltage UR is present at the output of the operational amplifier OP2, the amplitude of which depends on the quotient of the two time constants. It can easily be shown that the amplitude is directly proportional to the process pressure p~$C_R/C_M$~1, wherein the dependence is essentially linear. The amplitude can be adjusted via the voltage divider formed by the two resistors $R_5$ and $R_6$.

Via a sample-and-hold circuit S&H the positive and negative amplitude A+ and A− of the square wave signal are added in terms of absolute value, wherein the absolute value A is output as measuring voltage $U_{Mess}$ at the output of the operational amplifier OP3 and forwarded to the microcontroller μC (not shown). However, it could also be output directly as an analog value. The amplitude of the input voltage $U_{E0}$, which is provided at the output of the square wave generator RG, is adjusted in dependence of the measuring voltage $U_{Mess}$ in order to achieve a better linearity. To this end, a voltage divider consisting of resistors $R_{20}$ and $R_{10}$ is provided. This voltage divider is connected to a reference voltage VREF and is advantageously adjustable.

The positive operating voltage V+ is typically +2.5 V and the negative operating voltage V− is typically −2.5 V.

Figure 4:
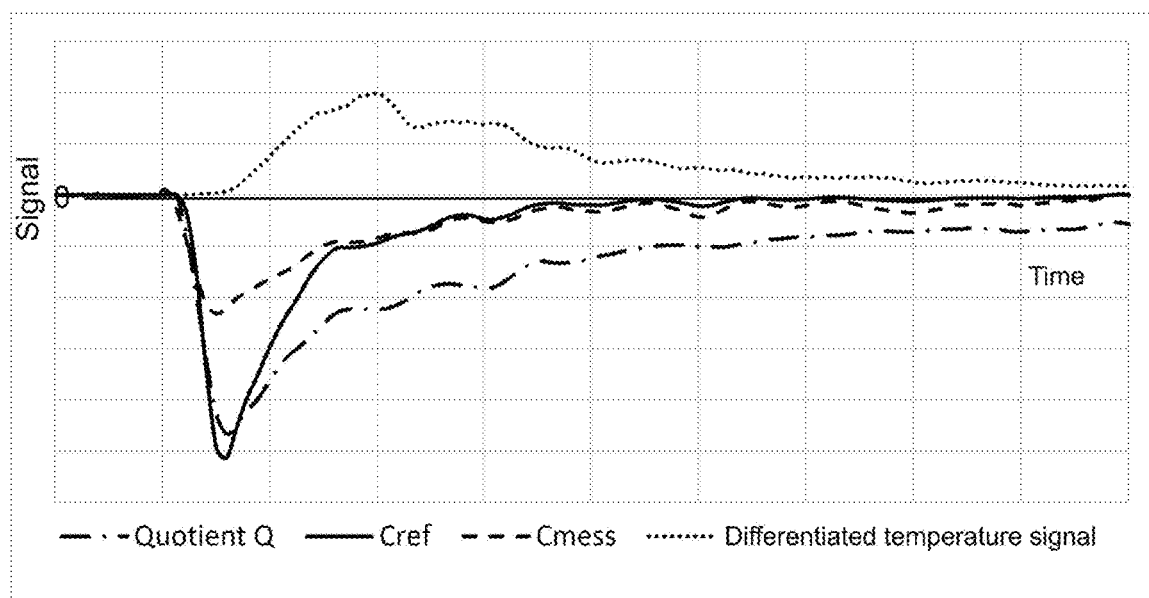
FIG. 4 a diagram showing an exemplary curve of quotient Q, the capacitance values of the reference capacitor ($C_R$) and the measuring capacitor ($C_M$) and a differentiated temperature signal over time in the case of a temperature shock without external pressure influence.

FIG. 4 shows a diagram of how in the case of a temperature shock without external pressure influence the curves of quotient Q, the capacitance values of the reference capacitor $C_R$ and the measuring capacitor $C_M$ as well as the differentiated signal of the temperature element 17 could appear over time as an example. Here, the quotient Q is dash-dotted, the measuring capacitor $C_{mess}$ is dashed, the differentiated signal of the temperature element 17 is dotted and the reference capacitor $C_{ref}$ is shown as a continuous line.

The temperature shock starts at the beginning of the second box (in x-direction). It can be seen with which clear delay the temperature element 17 reacts to the temperature influence. On the other hand, this strong temperature change is "noticed" immediately in the capacitance values of the measuring and the reference capacitor, wherein the reference capacitor shows a significantly stronger signal amplitude compared to the measuring capacitor. This phenomenon is already known from EP 2 189 774 B1 cited at the beginning.

Normally, the values of the measuring capacitor $C_M$, the reference capacitor $C_R$, and those of the corresponding quotient Q should behave almost identically or correspondingly, but not seen until the end of the third box in the x-direction. However, due to the temperature shock, there is a clear discrepancy between the two values, which already appears immediately at the beginning of the temperature shock. According to the invention, this discrepancy is used as a trigger to switch the entire unit into a safety mode, i.e. to a kind of "alarm state", during which the corresponding environmental conditions can be investigated with regard to a possible cause. By observing the temperature element 17, it would be possible to determine very quickly in the present example that a temperature shock is actually present, and by means of an appropriate compensation procedure, the error influence on the pressure measurement value could be subtracted. However, the very first moment after the temperature shock is decisive, when the temperature element 17 has not yet reacted at all and thus naturally no temperature compensation can yet be initiated. This is where the advantage of the method according to the invention becomes apparent, since it is already possible to switch into a safety mode at this early point in time, since an exceptional situation must be present in any case.

As already described, it can be seen that the value of the measuring capacitor was falsified by the temperature shock to a much lesser extent than the value of the reference capacitor and thus also the quotient Q formed from both values. This then leads to the fact that in the very first moment, when still no compensation of the temperature error takes place, the capacitance value of the measuring capacitor can be output as pressure measurement value p, in order to keep at least the degree of error as small as possible.

In the case of a mechanical damage to the pressure measuring cell, in particular the membrane, a similar curve of the values of quotient Q and measuring capacitance would result at the beginning, however, in this case the signal of the temperature element 17 would not show such an amplitude as in FIG. 4. If then a switch into the safety mode described above occurs, it would be possible to quickly determine by observing the temperature element 17 that in this case no temperature shock is present and that instead a different cause of error has to be searched for. For example, an investigation with respect to a mechanical damage could then be initiated by means of the method described in EP 2 606 330 B1, in which by use of an additional capacitor, whose capacitance is independent of the membrane pressure, a control pressure measurement value is determined and compared with the actual pressure measurement value p.

LIST OF REFERENCE SYMBOLS

1 Pressure measuring device
10 Pressure measuring cell
12 Base body
14 Membrane
16 Glass solder ring
17 Temperature Element
18 Vent channel
19 Cavity
20 Evaluation electronics
30 Evaluation circuit
$C_M$, $C_{mess}$ Measuring capacitor
$C_R$, $C_{ref}$ Reference capacitor
Q Quotient
p Pressure measurement value
M Center electrode
R Ring electrode
ME Membrane electrode
IZ Integrating branch
DZ Differentiating branch
SG Threshold comparator
RG Square wave generator

The invention claimed is:

1. A method for monitoring a function of a capacitive pressure measuring cell (10) comprising a measuring capacitor ($C_M$) and a reference capacitor ($C_R$) as well as a temperature element,
wherein a pressure measurement value p is obtained by forming a quotient Q from the capacitance values of the reference capacitor ($C_R$) and the measuring capacitor ($C_M$),
the method comprising the following method steps:
in a matching procedure, determining and storing in a lookup table a characteristic curve of values of the quotient Q and the corresponding capacitance of the measuring capacitor ($C_M$) versus pressures at different temperature scenarios, so as to define an expected behavior of a course in which corresponding absolute values of the quotient Q and the capacitance of the measuring capacitor ($C_M$) are compared with each other at the different temperature scenarios;
then in an operation step, continuously assigning each of the corresponding absolute values of the quotient Q and the corresponding capacitance of the measuring capacitor ($C_M$) from the lookup table with a pressure measurement value p at a temperature detected at a respective moment by the temperature element;
continuing with the operation step, determining a behavior of a course in which corresponding absolute values of the quotient Q and the capacitance of the measuring capacitor ($C_M$) are compared with each other at the temperatures detected by the temperature element;
wherein:
in the case of a significant deviation of the determined behavior from the expected behavior, the evaluation unit is temporarily switched into a safety mode while a temperature gradient detected by the temperature element is evaluated; then
if there is a significant increase in the detected temperature gradient, a temperature compensation is initiated; and
if there is no significant increase in the detected temperature gradient, an error signal is generated.

2. The method according to claim 1,
wherein during the safety mode the pressure measurement value p is obtained only by the capacitance value of the measuring capacitor ($C_M$).

3. The method according to claim 2,
wherein the pressure measurement values p obtained respectively by the measuring capacitor ($C_M$) alone and by the quotient Q are compared with one another.

4. The method according to claim 1,
wherein in the matching procedure, in addition to the characteristic curves of the quotient Q and the capacitance values of the measuring capacitor ($C_M$), the charging and discharging times of the measuring capacitor and the reference capacitor ($C_M$, Cr) versus the pressure and at different temperature scenarios have also been stored in the lookup table, the corresponding absolute value of the charging and discharging time from the lookup table is continuously assigned to the determined pressure measurement value p at the temperature detected at this moment by the temperature element, and the behavior of the course of the absolute values of the quotient Q, of the capacitance value of the measuring capacitor ($C_M$) and of the charging and discharging time are compared with one another.

* * * * *